United States Patent
Wanda

(10) Patent No.: US 8,878,385 B2
(45) Date of Patent: Nov. 4, 2014

(54) APPARATUS FOR CONTROLLING POWER SUPPLIED TO DISCHARGE LAMP IN RESPONSE TO COMMAND SUPPLIED FROM OUTSIDE THE APPARATUS

(75) Inventor: Yoshihiro Wanda, Okazaki (JP)

(73) Assignee: Denso Corporation, Kariya (JP)

( * ) Notice: Subject to any disclaimer, the term of this patent is extended or adjusted under 35 U.S.C. 154(b) by 435 days.

(21) Appl. No.: 13/199,434

(22) Filed: Aug. 30, 2011

(65) Prior Publication Data

US 2012/0074871 A1   Mar. 29, 2012

(30) Foreign Application Priority Data

Sep. 1, 2010   (JP) ................................. 2010-195720
Aug. 15, 2011   (JP) ................................. 2011-177658

(51) Int. Cl.
*B60L 1/14*   (2006.01)
*H05B 41/288*   (2006.01)

(52) U.S. Cl.
CPC ........... H05B 41/2885 (2013.01); *Y02B 20/202* (2013.01)
USPC ............................ 307/10.8; 315/308; 315/309

(58) Field of Classification Search
CPC ........ H05B 37/02; H05B 41/14; H05B 41/16; H05B 41/18; H05B 41/24; H05B 41/36
USPC .................. 307/10.1, 10.8; 315/77, 224–226, 315/209 M, 247, 291, 308, 309, DIG. 4, 5, 7
See application file for complete search history.

(56) References Cited

U.S. PATENT DOCUMENTS

| | | | |
|---|---|---|---|
| 6,954,038 B2 * | 10/2005 | Ido et al. ........................ | 315/291 |
| 7,368,881 B2 * | 5/2008 | Suganuma et al. ............ | 315/291 |
| 7,511,432 B2 * | 3/2009 | Watanabe et al. ......... | 315/209 R |
| 8,089,215 B2 * | 1/2012 | Tanaka et al. ................. | 315/291 |
| 2005/0189885 A1 | 9/2005 | Haruna et al. | |
| 2006/0256560 A1 | 11/2006 | Okura | |

FOREIGN PATENT DOCUMENTS

| | | |
|---|---|---|
| CN | 1514681 | 7/2004 |
| JP | 04-092391 | 3/1992 |
| JP | 2001-326086 | 11/2001 |
| JP | 2005-243284 | 9/2005 |
| JP | 2005/243381 | 9/2005 |
| JP | 2006-062594 | 3/2006 |
| JP | 2006-261032 | 9/2006 |
| JP | 2007-149520 | 6/2007 |
| JP | 2008/243628 | 10/2008 |
| WO | WO 2005/041621 | 5/2005 |
| WO | WO 2009/145108 | 12/2009 |

* cited by examiner

OTHER PUBLICATIONS

Office Action issued Jul. 24, 2012 in corresponding Japanese Application No. 2011-177658 with English translation.
Office action dated Sep. 3, 2013 in corresponding Chinese Application No. 201110260375.8.

*Primary Examiner* — Thuy Vinh Tran
(74) *Attorney, Agent, or Firm* — Harness, Dickey & Pierce, PLC

(57) ABSTRACT

There is provided a discharge lamp controlling apparatus mounted on vehicles or others. The apparatus includes a discharge lamp, a power control section, a signal inputting section, and a storage which are united with each other. The signal inputting section allows a power command signal to be inputted from the outside of the apparatus, the power command signal being for commanding the value of power supplied to the discharge lamp, and extracts from the inputted power command signal commanded power values which command the value of the power. The storage section stores therein, at least, the newest commanded power value among the extracted commanded power values. The power control section controls the power supplied to the discharge lamp based on the newest command values stored in the storage section.

11 Claims, 7 Drawing Sheets

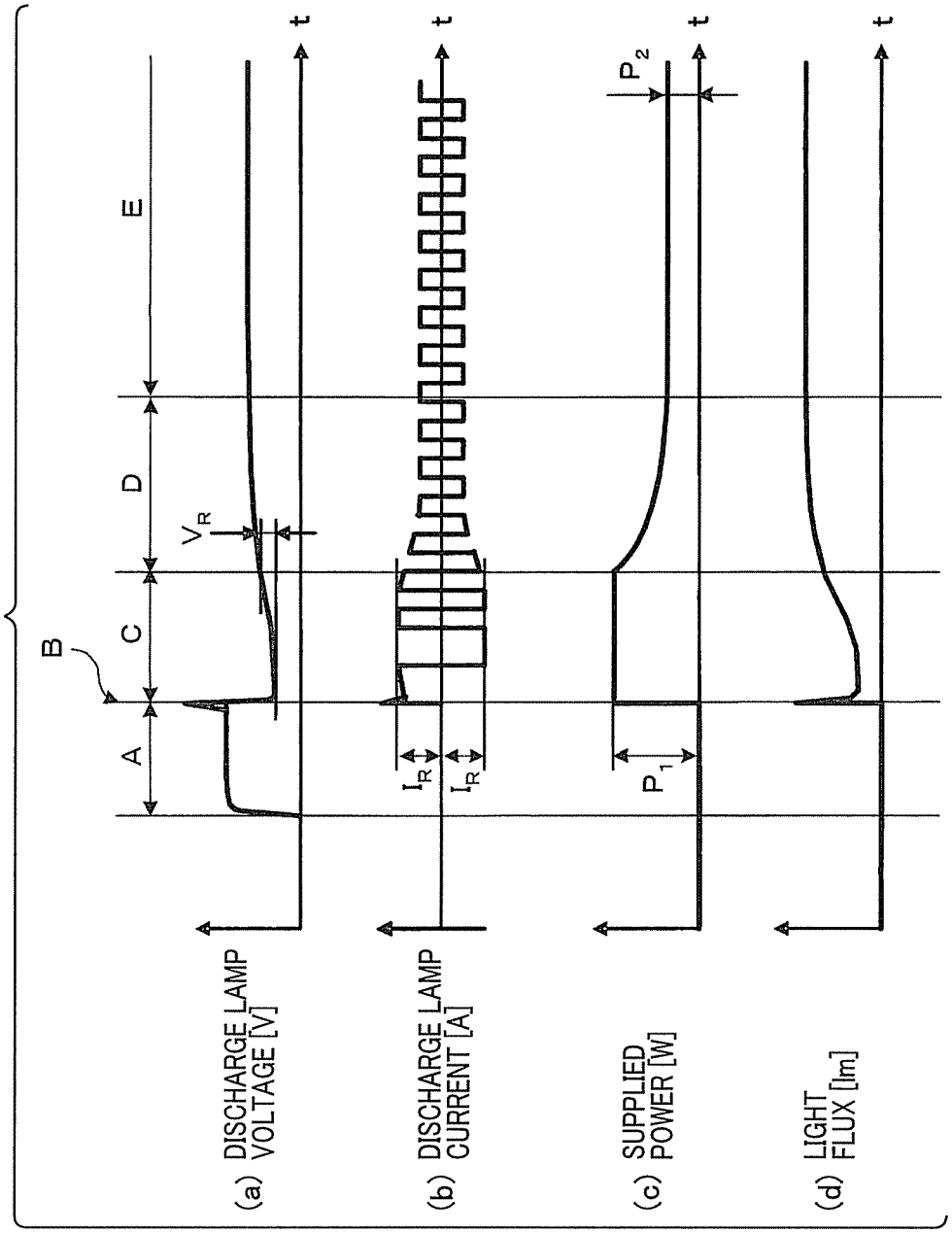

APPARATUS FOR CONTROLLING POWER SUPPLIED TO DISCHARGE LAMP IN RESPONSE TO COMMAND SUPPLIED FROM OUTSIDE THE APPARATUS

CROSS REFERENCE TO RELATED APPLICATIONS

This application is based on and claims the benefit of priority from earlier Japanese Patent Applications No. 2010-195720 filed Sep. 1, 2010 and 2011-177658 filed Aug. 15, 2011, the description of which is incorporated herein by reference.

BACKGROUND OF THE INVENTION

1. The Technical Field

The present invention relates to a discharge lamp lighting apparatus that controls lighting of a discharge lamp to be mounted in vehicles or others, and in particular to the discharge lamp lighting apparatus that controls power to be supplied to the discharge lamp in response to a commanded power value supplied from outside the apparatus.

2. Related Art

Currently, a discharge lamp mounted on a vehicle is normally lighted by a light apparatus. Both the discharge lamp and the lighting apparatus are currently provided as different members on a vehicle. The light-emitting characteristic of a discharge lamp to power supplied varies depending on each discharge lamp and the output power from the discharge lamp also varies depending on each discharge lamp lighting apparatus. Hence, when the discharge lamp and the discharge lamp light apparatus, which are mutually separated devises, are electrically connected and operated, the flux of light emitted from the discharge lamp may vary more significantly.

In consideration with this fact, there is known a technique that suppress variations in the foregoing light flux value by adjusting power to be supplied to the discharge lamp. For example, Japanese Patent Laid-open Publication No. 2007-149520 provides a technique to simplify the foregoing adjustment, where the light flux value of a discharge lamp is controlled by providing a power control apparatus with a dimming signal from outside the power control apparatus.

However, even in conducting the foregoing technique that uses the dimming signal supplied externally, which is shown by the foregoing publication, the discharge lamp and the lighting apparatus are separated device by device in a vehicle. In other words, the operating characteristics of both the discharge lamp and the discharge lamp lighting apparatus are not always matched with each other in a one-to-one correspondence. Hence, when the discharge lamp is finally assembled in a vehicle, it is frequent that the value of flux of light varies significantly. In addition, this variation occurs often whenever the discharge lamp and the lighting apparatus are assembled to a vehicle.

SUMMARY

In consideration of this situation, it is desired to provide a discharge lamp lighting apparatus that can suppress the value of flux of light emitted from a discharge lamp even when repeating assembly of the discharge lamp to a vehicle.

According to one example of the disclosure, a discharge lamp lighting, apparatus comprises: a discharge lamp; power controlling means that controls power to be supplied from a power supply to the discharge lamp; signal inputting means that accepts input of a power command signal from an outside of the apparatus and extracts from the inputted power command signal commanded power values, the power command signal being for commanding a value of the power used by the power controlling means, the commanded power values commanding the value of the power; and storage means that stores therein, at least, the commanded power value which is the newest among the commanded power values extracted by the signal inputting means, the discharge lamp, the power controlling means, the signal inputting means, and the storage means being provided integrally with each other, wherein the power controlling means is configured to control the power to be supplied to the discharge lamp based on the newest commanded power value stored in the storage means.

"The commanded power values" mean a command value for power to be supplied to the discharge lamp, and controlled in the power controlling means.

In addition, the present discharge lamp lighting apparatus includes the discharge lamp. In other words, the discharge lamp is integral with the discharge lamp lighting apparatus.

In this discharge lamp lighting apparatus, the power controlling means controls the power supplied from a power supply to the discharge lamp. In this control, the newest command value among commanded power values extracted from an inputted power command signal is, at least, stored in the storage means, and, based on the newest commanded power value among the commanded power values, the power to the discharge lamp is controlled.

Hence, in the discharge lamp lighting apparatus, by only inputting a power command signal from outside the apparatus, the flux of light from the discharge lamp can be adjusted.

Further, in response to input of a power command signal from outside the apparatus, commanded power values are extracted, and, at least, the newest commanded power value among the extracted commanded power values is stored in the storage means. Thus, a commanded power value obtained at a time when adjustment of the flux of light from the discharge lamp has been completed is used to control the power, and that commanded power value is stored in the storage means.

In addition, the storage means in which a commanded power value is stored, the power controlling means, and the discharge lamp are united. Thus, once the flux of light from the discharge lamp has been adjusted, it is not required the member be combined with another power controlling means or another discharge lamp. Accordingly, the discharge lamp is always matched in electric characteristics with the lighting apparatus, thus providing the once-adjusted flux of light continuously.

It is therefore possible to provide the discharge lamp light apparatus with less fluctuation in the flux of light emitted from the discharge lamp even when the lighting apparatus is repeatedly assembled with vehicles.

By the way, there are several methods of giving the power command signal to the discharge lamp lighting apparatus. For example, one method is to use a power line through which the power command signal is inputted such that the signal is superposed on the power supplied to the discharge lamp via the power line. Another method is to use such a signal line, which is different from the power line, as a dedicated input line for the power command signal.

In inputting the power command signal via the power line in a superposition manner, the signal inputting means may be electrically connected to the power line. And the signal inputting means may include signal separating means for separating the power command signal from the power transmitted via the power line and signal extracting means for extracting a commanded power value from the power command signal separated by the signal separating means.

This configuration makes it possible to provide the discharge lamp lighting apparatus with the power command signal by using only the power line. Thus there is no need of having a signal line and a terminal both of which are dedicated to input only the power command signal. When viewing this configuration as a system including a battery and lighting up the discharge lamp, the number of signal lines can be reduced.

In cases where the power command signal is inputted via a signal line which is different from the power line, the signal inputting means may be electrically connected to that signal line and may include signal extracting means for extracting a commanded power value from the power command signal inputted through that signal line.

In this configuration, it is not required to have the signal separating means for separating the power command signal from the power transmitted via the power line. Hence, the discharge lamp lighting apparatus can be simplified in its construction.

In order to store the newest commanded power value in the storage means, the commanded power values extracted by the signal inputting means are overwritten in sequence one on another in the storage means. This makes it possible to reduce a memory size necessary for the storage means. The discharge lamp lighting apparatus can be made compact more and manufacturing cost can be reduced.

In lighting the discharge lamp, voltage applied to the discharge lamp changes with a lapse of time from its lighting start. Depending on modes of changes in the voltage, the modes can be divided into "a first transition period", "a steady period", and "a second transition period". The first transition period is a period starting from a time when the voltage initially reduces after starting to supply the power to the discharge lamp to a time when the voltage increases so as to provide a predetermined voltage change amount. The steady period is a period during which the voltage value is constant. The second transition period is an intermediate period residing between the first transition period and the steady period.

Hence, voltage detecting means for detecting a discharge lamp voltage applied to the discharge lamp and current detecting means for detecting a discharge lamp current flowing through the discharge lamp are provided. In this case, the power controlling means controls the power supplied to the discharge lamp at a first constant power value during the first transition period. This period starts from a time at which the voltage detected by the voltage detecting means initially drops after starting to supply the power to the discharge lamp, to a time at which the voltage increases to show the predetermined voltage change amount. During the second transition period from a time when the voltage detected by the voltage detecting means exceeds the voltage change amount to a time when the voltage becomes constant, the power controlling means controls the power supplied to the discharge lamp so as to decrease with the lapse of time. In the steady period starting from the time when the voltage detected by the voltage detecting means has become constant, the power controlling means controls the power to the discharge lamp at a second constant power value which is less than the first constant power value.

Hence, during the first transition period, the first power value which is larger in amount can be supplied, allowing the discharge lamp to be lit quickly. The power supplied during the steady state can be suppressed down to the second power value less than the first power value.

Additionally, the power supplied during the first transition period is held at a constant value (i.e., the first constant power value), the amount of current of the discharge lamp (5) may become larger. In this case, if such a larger current is allowed to flow, the discharge lamp will have a shorter operating life.

In consideration this fact, the power controlling means also limits the current of the discharge lamp, which is detected by the current detecting means, such that the detected current does not exceed a predetermined current threshold. This prevents an excessive flow of the current passing through the discharge lamp, preventing the life of the discharge lamp from being shorter.

For example, there may be provided temperature detecting means for detecting temperature at the power control section. Responsively, the power controlling means may reduce the power to the discharge lamp down to a predetermined amount when the temperature detected by the temperature detecting means exceeds a preset temperature. Hence, if the temperature of the power controlling means is over the preset value due to, for example, usage under a higher-temperature environment, the supplied power can be reduced down to the preset value. This is effective for preventing the power controlling means from being subject to malfunctions caused by an excessive increase in the temperature.

BRIEF DESCRIPTION OF THE DRAWINGS

In the accompanying drawings:

FIG. 4A is a diagram showing characteristics of discharge lamp voltage, discharge lamp current, supplied power, and flux of light obtained when a discharge lamp is lighted up in a discharge lamp lighting apparatus according to a third embodiment of the present invention;

DETAILED DESCRIPTION OF PREFERRED EMBODIMENTS

Referring to the accompanying drawings, various embodiments to which the present invention is applied will now be described.

First Embodiment

Figure 1:
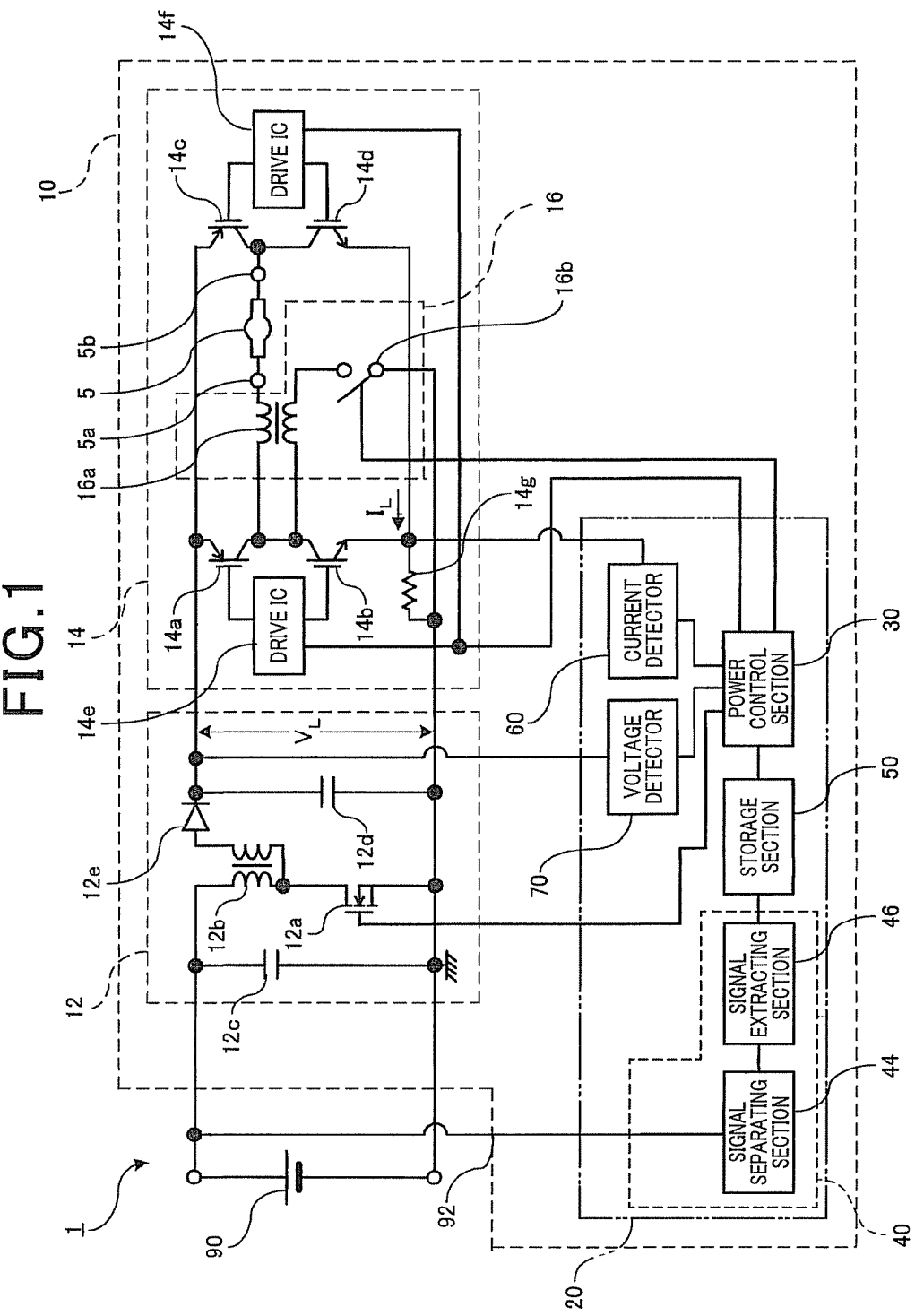
FIG. 1 is a circuit diagram showing an outlined circuit configuration of a discharge lamp lighting apparatus according to a first embodiment of the present invention.
Figure 2:
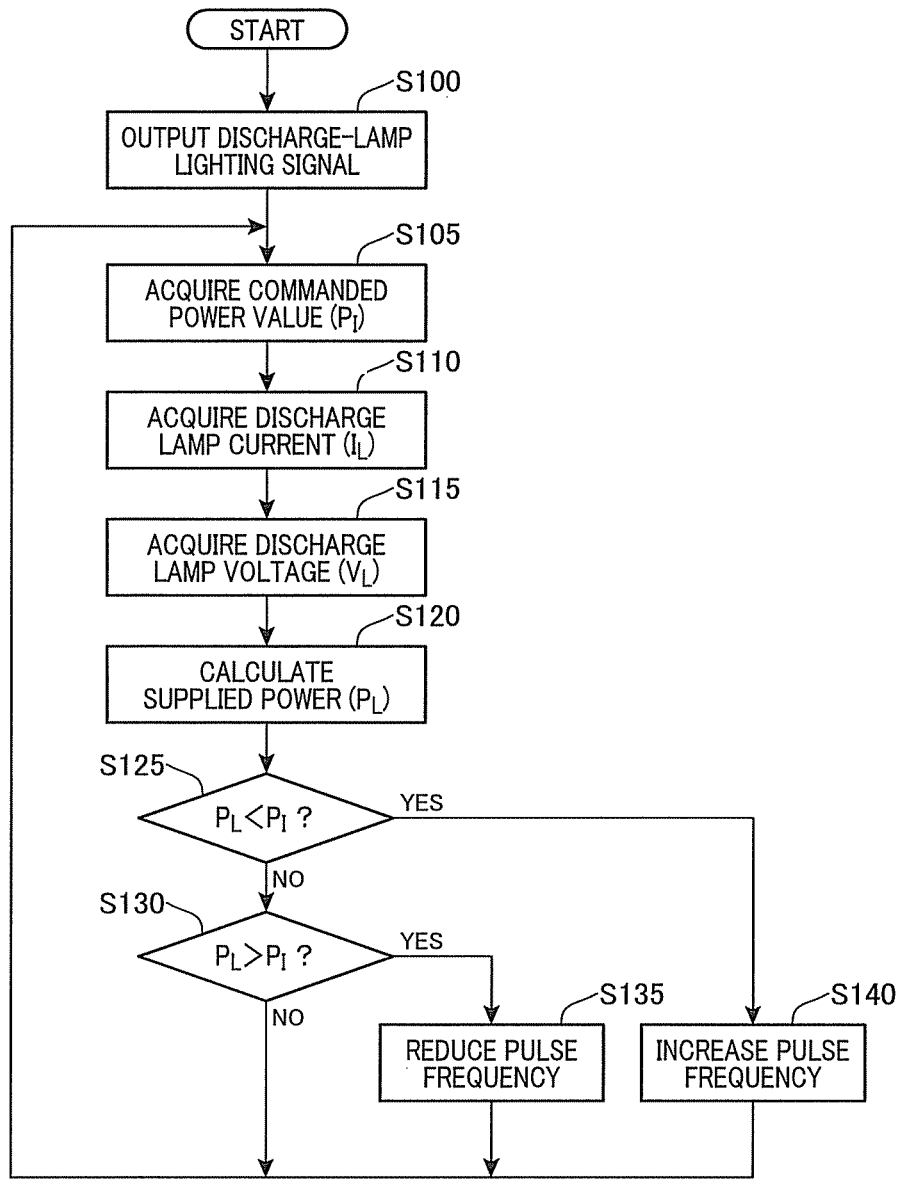
FIG. 2 is a flowchart showing a flow of a control process performed in the first embodiment.

Referring to FIGS. 1 and 2, a discharge lamp lighting apparatus according to a first embodiment of the present invention will now be described.

FIG. 1 shows circuitry outlining a discharge lamp lighting apparatus 1 to be mounted in vehicles or others, which is according to the first embodiment. This discharge lamp lighting apparatus 1 is equipped with, as shown in FIG. 1, a discharge lamp 5 and a drive circuit 10 which are unified as a single member. Practically, the discharge lamp 5 and the drive circuit 10 are electrically connected to each other and are configured as a single electrical circuit unit (i.e., a single discharge lamp unit).

The discharge lamp 5 has discharge electrodes and functions as a light source emitting light by causing the discharge electrodes to perform arc discharge or glow discharge. Practically, the discharge lamp is a neon bulb, a metal halide lamp, a xenon lamp, or a mercury lamp.

The drive circuit 10 has a boosting section 12, an H-formed bridge 14, a start-up section 16, and a control circuit 20.

The boosting section 12 is a DC-DC converter, called a non-insulation type of DC-DC converter, and has an MOSFET 12a which is a switching element, a transformer 12b, capacitors 12c and 12d, and a diode 12e.

As shown in FIG. 1, in the boosting section 12, the transformer 12b has a primary winding whose one end is electrically connected to the drain of the MOSFET 12a. The other end of the primary winding is electrically connected to the positive terminal of a battery 90.

The source of the MOSFET 12a is connected to the ground GND, while the gate of the MOSFET 12a is connected to a power control section 30 of the control circuit 20.

The transformer 12b has a secondary winding whose one end is connected to the drain of the MOSFET 12a and whose other end is connected to the anode of the diode 12e. The cathode of the diode 12e supplies an output to the boosting section 12.

With this configuration, by changing the frequency of the pulse signal inputted from the power control section 30 of the control circuit 20 to the gate of the MOSFET 12a, the ON/OFF cycles of the MOSFET 12a can be changed. This makes it possible to step up DC power, supplied to a battery 90 connected to the primary winding of the transformer 12b, up to a desired amount of voltage, with this stepped-up voltage outputted from the secondary winding.

The H-formed bridge (or simply H bridge) 14 is a circuit which lights up the discharge lamp 5 by providing the output voltage of the boosting section 12 to the discharge lamp. As shown in FIG. 1, the H-formed bridge is structured by a bridge circuit using two PNP type transistors 14a and 14c and two NPN type transistors 14b and 14d (hereinafter, simply, the PNP type transistors 14a and 14c and the NPN type transistors 14b and 14d are also referred to as transistors).

Practically, transistor 14a has an emitter connected to the cathode of the diode 12e in the boosting section 12. The collector of the transistor 14a is connected to the collector of the transistor 4b. The transistor 14b has an emitter connected to the ground GND via a shunt resistor 14g.

The collector of the transistor 14a (i.e., the collector of the transistor 14b) is connected to one of power input terminals of the discharge lamp 5 (i.e., a terminal shown by 5a in FIG. 1) via the start-up section 16.

In contrast, the transistor 14c has an emitter connected to the cathode of the diode 12e in the boosting section 12. The collector of the transistor 14c is connected to the collector of the transistor 14d. The emitter of the transistor 14d is connected to the ground GND via a shunt resistor 14g.

Further, the collector of the transistor 14c (i.e., the collector of the transistor 14b) is connected to the other power input terminal of the discharge lamp 5 (i.e., the terminal shown by 5b in FIG. 1).

The bases of both the transistors 14a and 14b are connected to a drive IC 14e, while the bases of both the transistors 14c and 14d are connected to a drive IC 14f.

The drive ICs 14e and 14f are connected to the power control section 30 of the control circuit 20. Driving the drive ICs 14e and 14f alternately by signals from the power control section 30 allows the discharge lamp 5 to be lighted up.

Practically, when the drive IC 14e applies a low voltage to the bases of the transistors 14a and 14b, the emitter-collector path of the PNP type transistor 14a is switched ON, while the collector-emitter path of the NPN type transistor 14b is switched OFF.

In parallel, when the drive IC 14f applies a high voltage to the bases of the transistors 14c and 14d, the emitter-collector path of the PNP type transistor 14c is switched OFF, while the collector-emitter path of the NPN type transistor 14d is switched ON.

This switching makes it possible that the discharge lamp current flows from the transistor 14a to the power input terminal 5a, and to the power input terminal 5b of the transistor 14a, and then flows through the transistor 14d to the ground GND, lighting up the discharge lamp 5.

In contrast, the drive IC 14e applied the high voltage to the bases of both the transistors 14a and 14b and, in parallel, the drive IC 14f applies the low voltage to the bases of both the transistors 14c and 14d. In response to application of these voltages, the emitter-collector path of the PNP type transistor 14a is switched OFF, the collector-emitter path of the NPN type transistor 14b is switched ON, the emitter-collector path of the PNP type transistor 14c is switched ON, and the collector-emitter path of the NPN type transistor 14d is switched OFF.

In this case, the discharge lamp current flows from the transistor 14c to the power input terminal 5b, and to the power input terminal 5a of the discharge lamp 5, through the transistor 14b, and to the ground GND, resulting in lighting up the discharge lamp 5.

In this way, by using the H-formed bridge 14, the discharge lamp 5 can be lighted up in an alternating-current fashion. This alternating-current type of lighting leads to an even wearing of the discharge electrodes of the discharge lamp 5, thereby making the life of the discharge lamp 5 longer.

The start-up section 16 is a circuit to apply a high discharge-lamp voltage to the discharge lamp 5 temporarily when starting to light up the discharge lamp 5.

As the discharge lamp 5 is a light source which uses arc discharge or glow discharge as stated already, it is necessary to apply the high voltage to the discharge lamp. This voltage application will cause a discharge in the initial lighting action. For this discharge, it is necessary that the start-up section 16 is provided with a transformer 16a and a switch 16b.

The transformer 16a has a secondary winding whose one end is electrically connected to the collector of the transistor 14a (and the collector of the transistor 14b) and whose other end is electrically connected to the power input terminal 5a of the discharge lamp 5. The primary winding of the transformer has two ends, one of which is electrically connected to the collector of the transistor 14a (and the collector of the transitory 14b) and the other of which is electrically connected to one of the two ends of the switch 16b. The other end of the switch is connected to the ground GND.

The switch 16b has a connection with the power control selection 30 arranged in the control circuit 20, and is selectively switched ON/OFF in response to a single form the power control section 30.

With this configuration, in the initial lighting period of the discharge lamp 5 (i.e., when the discharge is started), the switch 16b is temporarily switched ON by the power control section 30. Turning on the discharge lamp 5 allows the transformer 16a to apply a high discharge lamp voltage to the discharge lamp 5, thereby starting a discharge in the discharge lamp 5, thereby lighting it up.

Once the discharge lamp 5 is lighted up, such an application of the high discharge-lamp voltage is not required any more. Hence, the power control section 30 turns off the switch 16b.

The control circuit 20 is provided with, in addition to the power control section 30, the signal inputting section 40, a storage section 50, a current detector 60, and a voltage detector 70.

The signal inputting section 40 receives input of a power command signal from the outside, the power command signal being for commanding the value of power controlled in the power control section 30. Using the inputted power command signal, the signal inputting section extracts a commanded power value.

In the first embodiment, as shown in FIG. 1, the power command signal is superposed in power supplied via a battery line 92 which supplies the power to the discharge lamp 5. In the first embodiment, the power command signal, which is superposed in the power supplied via the battery line 92, is a serial digital signal.

The signal inputting section 40 is provided with a signal separating section 44 and a signal extracting section 46.

The signal separating section 44 is connected to the battery line 92 and formed to separate, from the power, the power command signal superposed in the battery line 92.

The signal extracting section 46 is formed to receive the power command signal separated by the signal separating section 44, and extract a commanded power value from the separated power command signal. That is, this signal extracting section functions as a signal converter that converts the serial digital signal to corresponding data.

The commanded power value is extracted from the serial digital signal separated by and supplied from signal separating section 44.

The storage section 50 has semiconductor memories, and the commanded power values extracted by the signal extracting section 46 are overwritten in sequence one on another in the storage section, whereby the newest commanded power value is stored therein. Additionally the storage section 50 is constructed to hold the commanded power value even when the power to the discharge lamp lighting apparatus 1 is turned off.

The current detector 60 is an ammeter to detect a discharge lamp current flowing through the discharge lamp 5. As shown in FIG. 1, the current detector is configured to detect the discharge lamp current $I_L$ by detecting a voltage across a shunt resistor 14g arranged in the H-formed bridge 14 of the drive circuit 10.

The voltage detector 70 is a voltmeter to detect a discharge lamp voltage across the discharge lamp 5. As shown in FIG. 1, the voltage detector is configured to detect an output voltage $V_L$ from the boosting section 12 of the drive circuit 10.

The power control section 30 is a circuit that controls supply of power from the battery 90 to the discharge lamp 5. This power control section uses the newest commanded power value stored in the storage section 50 to control the power supplied to the discharge lamp 5.

The power control section 30 has a digital circuit not shown in the drawing, and, using a program memorized in a ROM in the digital circuit, performs the following steps (S1) to (S7).

(S1): When the discharge lamp lighting apparatus 1 is powered on, the power control section provides a discharge-lamp lighting signal to the start-up section 16, thereby starting (lighting) the discharge lamp 5.

(S2): The power control section acquires a commanded power value stored in the storage section 50.

(S3): The power control section acquires a discharge lamp current value from the current detector 60.

(S4): The power control section acquires a discharge lamp voltage value from the voltage detector 70.

(S5): The power control section calculates a power ($I_L \times V_L$) supplied to the discharge lamp 5 based on the discharge lamp current value acquired from the current detector 60 and the discharge lamp voltage value acquired from the voltage detector 70.

(S6): In order that the power calculated at step (S5) (that is, the power supplied to the discharge lamp 5) becomes the commanded power value acquired at step (S1), the power control section generates a switching pulse towards the gate of the MOSFET 12a, so that the MOSFET 12a in the boosting section 12 is switched ON and OFF. By controlling the frequency of the switching pulse having a specified pulse width, the output voltage of the boosting section 12 is controlled.

(S7): To control the lighting actions of the discharge lamp 5 which acts depending on the foregoing the H-formed bridge 14, the power control section drives the drive IC 14e and 14f of the H-formed bridge 14 to control the base voltage of each of the transistors 14a to 14d.

In this embodiment, the "commanded power value" means a command value commanding how much power should be supplied to the discharge lamp 5, and is controlled by the power control section 30.

(Description of Control Process)

With reference to FIG. 2, a control process performed by the power control section 30 will now be described. FIG. 2 is a flowchart showing a flow of the control process.

The control process is started in response to powering on the discharge lamp lighting apparatus 1, and processed as shown in FIG. 2. First, at step S100, the discharge-lamp lighting signal is outputted to the start-up section 16. This signal enables the switch 16b of the start-up section 16 to be switched ON, whereby a high discharge lamp voltage is applied to the discharge lamp 5, lighting up the discharge lamp 5. When a preset period of time has passed thereafter, a signal to switch off the switch 16b is outputted.

At the succeeding step S105, a commanded power value $P_I$ is read out from the storage section 50; at step S110, a discharge lamp current $I_L$ of the discharge lamp 5 is acquired from the current detector 60; and at step S115, a discharge lamp voltage $V_L$ of the discharge lamp 5 is acquired from the voltage detector 70.

Then, at step S120, a value of supplied power is calculated based on a formula of $P_L = I_L \times V_L$ based on the discharge lamp current $I_L$ acquired at step S110 and the discharge lamp voltage $V_L$ acquired at step S115.

Furthermore, at step S125, it is determined whether or not the value of the supplied power $P_L$ calculated at step S120 is less than the commanded power value $P_I$ obtained at step S105.

If it is determined that the supplied power ($P_L$) is less than the commanded power value $P_I$ (i.e., Yes at step S125), the processing is shifted to step S140. In contrast, if it is determined that the supplied power $P_L$ is equal to or larger than the commanded power value $P_I$ (i.e., No at step S125), the processing is shifted to step S130.

At step S130, it is further determined whether or not the supplied power $P_L$ is larger than the commanded power value $P_I$. When it is determined that the supplied power $P_L$ is larger than the commanded power value $P_I$ (i.e., Yes at step S130), the processing is shifted to step S135. In contrast, if it is determined that the supplied power $P_L$ is less than the commanded power value $P_I$ (No at step S130), the processing is returned to step S105 with the supplied power $P_L$ kept at its current amount, repeating the control process.

At step S135, the frequency of the pulse signal supplied to the gate of the MOSFET 12a is reduced, resulting in reducing the output voltage from the boosting section 12. Then the processing returns to the step S105 for repetition of the control process.

Meanwhile, at step S140, the frequency of the pulse signal given to the gate of the MOSFET 12a is increased, increasing the output voltage from the boosting section 12. Then the processing returns to the step S105 for repetition of the control process.

The control process is ended responsively to powering off the discharge lamp lighting apparatus 1.

(Features of Discharge Lamp Lighting Apparatus)

As described above, the discharge lamp lighting apparatus 1 has the power control section 30 that controls the power supplied from the battery 90 to the discharge lamp 5. In this control, at least, the newest commanded power value among commanded power values extracted from the power command signal is always held in the storage section. Based on the newest command power value, the power supplied to the discharge lamp is controlled.

Hence, in this discharge lamp lighting apparatus 1, simply inputting the power command signal from outside the apparatus makes it possible to easily adjust the flux of light emitted from the discharge lamp 5.

Additionally, when the power command signal is inputted from outside the power command signal, a command power value is extracted, and, at least, the newest commanded power value among the command power values is stored in the storage section 50. Accordingly, the power control can be performed with a command power value gained at a time when adjustment of the flux value of light from the discharge lamp 5 is completed, while the commanded power value used for the adjustment is stored in the storage section 50.

Moreover, the storage section 50 that memorizes the command power values, the power control section 30, and the discharge lamp 5 is united. Therefore, once adjustment of the flux of light from the discharge lamp 5 is completed, the discharge lamp 5 emits an amount of light flux which is always the same even when the discharge lamp is re-assembled into a vehicle. This is because the combination of the discharge lamp 5 and the drive circuit 10 is not changed.

In other words, when even repeatedly assembling the discharge lamp 5 with vehicles, the discharge lamp lighting apparatus 1 can make it possible that the amount of light flux emitted from the discharge lamp 5 is kept unchanged (not fluctuated, or fluctuates less).

In addition, use of only the battery line 92 enables the power command signal to be inputted. Thus there is no need to prepare signal lines and/or terminals dedicated to input of the power command signal.

It is therefore possible to reduce the number of signal lines transmitting signals, when viewing the apparatus as a system, including the battery, to light up the discharge lamp 5.

In the storage section 50, commanded power values extracted sequentially by the signal inputting section 40 are overwritten on one another in sequence so that the newest commanded power value can be stored thereat. This will reduce the memory size necessary for the storage section 50. Hence, the discharge lamp lighting apparatus 1 can be reduced in its size and in manufacturing cost.

Second Embodiment

Figure 3:
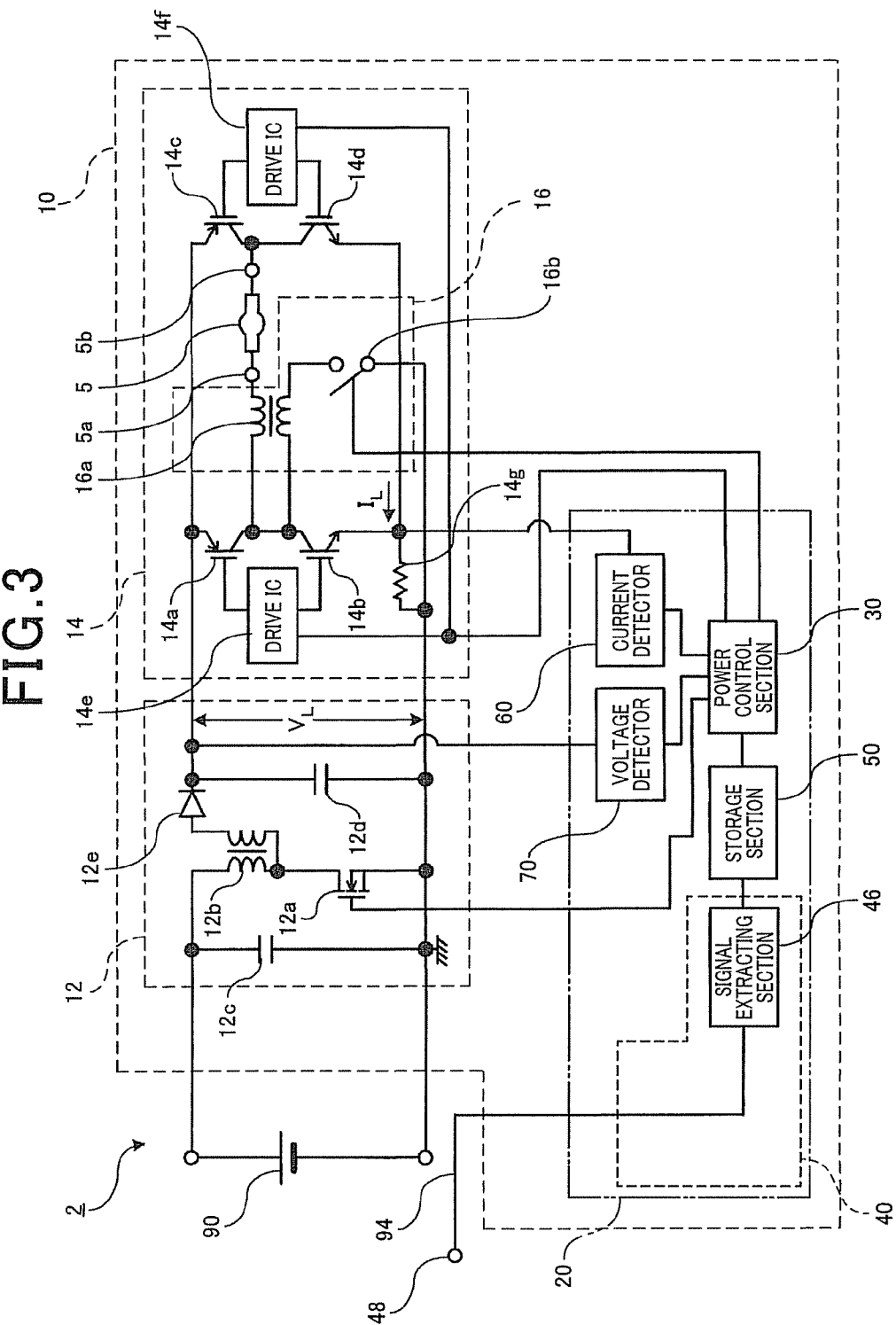
FIG. 3 is a circuit diagram showing an outlined circuit configuration of a discharge lamp lighting apparatus according to a second embodiment of the present invention.

Referring to FIG. 3, a discharge lamp lighting apparatus according to a second embodiment of the present invention will now be described.

In the second embodiment and subsequent embodiments therefrom, the components which are identical or similar to those described in the first embodiment are given the same reference numbers for the sake of omitting or simplifying the description.

The configuration in the second embodiment differs from that in the first embodiment in how the power command signal is received from the outside. In this respect, the signal inputting section 40 in the first embodiment uses the battery line 92 through which the power command signal is provided from outside the apparatus. By contrast, the discharge lamp lighting apparatus according to the second embodiment employs a signal line dedicated to receive the input of the power command signal.

FIG. 3 shows circuitry of a discharge lamp lighting apparatus 2 according to the present embodiment.

Except for the configuration of the signal inputting section 40, this discharge lamp lighting apparatus 2 has the same configuration as that in the discharge lamp lighting apparatus 1 of the first embodiment, where the same reference numbers as those in the first embodiment are given to the same components in FIG. 3.

In the discharge lamp lighting apparatus 2, as shown in FIG. 3, the power command signal is inputted via a signal line 94, not via the foregoing battery line 92.

Practically, the signal inputting section 40 is provided with a dedicated signal input terminal 48 in place of the foregoing battery line 92, and the power command signal is directly inputted to the signal extracting section 46 via the signal input terminal 48. Thus it is not required to use the signal separating section 44 described in the first embodiment.

Similarly to that in the first embodiment, commanded power values are extracted from the power command signal by the signal extracting section 46, and the extracted commanded power values are stored in the storage section 50 in sequence.

Also similarly to that in the first embodiment, the power control section 30 uses the command power values, stored in the storage section 50, to perform the control process shown as the flowchart in FIG. 2.

In this way, the signal separating section 44, which separates commanded power values from the power transmitted via the battery line 92 in the first embodiment, is not required. Hence, the discharge lamp lighting apparatus can be simplified in its configuration.

Third Embodiment

Figure 4B:
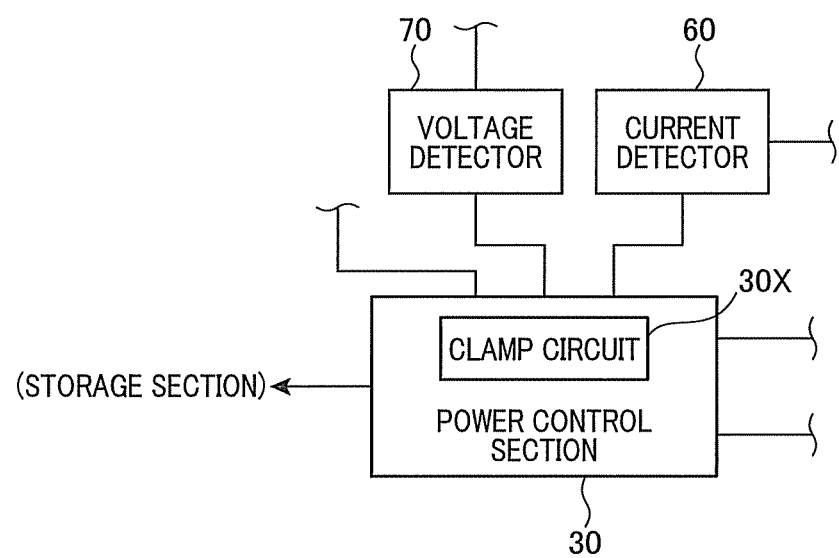
FIG. 4B is a block diagram partially showing a power control section having a current limiting function, which is used in the discharge lamp lighting apparatus according to the third embodiment.

Referring to FIGS. 4A and 4B, a discharge lamp lighting apparatus according to a second embodiment of the present invention will now be described.

The discharge lamp lighting apparatus according to the third embodiment is configured to control the power supplied to the discharge lamp in consideration of a transient phenomenon, by which the discharge lamp voltage varies over time after performing lighting of the discharge lamp 5.

FIG. 4A shows characteristics of the discharge lamp voltage, the discharge lamp current, the supplied power, and the flux of light obtained when the discharge lamp 5 is lighted up.

In the discharge lamp lighting apparatus of the third embodiment, the configuration is the same as the apparatus 1 in the first embodiment, attaching the same reference numbers to those same components for a simplified explanation.

In the third embodiment, as a preparation for lighting up the discharge lamp 5, the discharge lamp voltage is set to 400 [V] or thereabouts, as shown in (a) of FIG. 4 A (refer to a period of time "A" in (a) of this chart).

When a high voltage pulse whose amplitude is 20 [kV] or more is used for breaking down, the discharge lamp 5 begins its discharge, temporarily reducing the discharge lamp voltage (refer to a time instant "B" in (a) of the chart).

Continuing to apply the power thereafter, the temporarily reduce voltage recovers gradually, as shown in (a) of FIG. 4A (refer to a period of time "C" in (a) of this chart). In this example, the period of time from a time when the discharge lamp voltage drops temporarily to a time when the voltage recovers until a predetermined voltage value is called a first transition period (corresponding to a period of time "C"). The predetermined voltage value is also called a voltage change amount ($V_R$) which shows a relative change relative to the value of the temporarily reduced discharge lamp voltage.

During the first transition period C, the power supplied to the discharge lamp 5 is controlled to be constant, as shown in (c) of the chart. The supplied power in this period is defined as a first power value ($P_1$), which is set to be larger than a second power value ($P_2$) later described.

When the discharge lamp voltage exceeds the voltage change amount ($V_R$), the supplied power is reduced over time, as shown in (c) of the chart. After this reduction, the discharge lamp voltage is controlled to gradually increase during a period of time "D" in (a) of the chart, before being made to be constant.

Meanwhile, the discharge lamp current gradually decreases from a start of the period of time D, before becoming constant, as shown in (b) of the chart. A period of time starting from a time when the discharge lamp voltage exceeds the voltage change amount (VR) to a time when the voltage becomes constant through a gradual increase period, as described above, is called "a second transition period." (corresponding to a period of time "D" in the chart).

Then, at a time when the second transition period D finishes, that is, the constant discharge lamp voltage begins, the supplied power is controlled at a constant amount. This will cause the discharge lamp current to be constant as well. A period of time during which the discharge lamp voltage becomes constant successively to the lapse of the second transition period D in this way is called a steady period (refer to a period of time "E" in (a) at the chart). The supplied power in the steady period is defined as a second power value ($P_2$), which is set to be smaller than the foregoing first power value ($P_1$).

By the way, as shown in (a) of FIG. 4A, there are some cases where the current value is excessive to the power control section 30. In particular, these cases may happen in the first transition period C. Such cases may results in a failure or a shortened duration of life.

In view of this fact, as shown in FIG. 4B, the power control setting 30 is formed to have a clamp circuit 30X to limit the amplitude of the discharge lamp current. This clamp circuit 30X is formed to limit the amplitude of the discharge lamp current, detected by the current detector 60, so as not to exceed a predetermined current threshold ($I_R$) during supplying the power to the discharge lamp 5.

Information of the foregoing power control pattern is previously memorized by the storage section 50, like the manner in the first embodiment. Hence, the power control section 30 uses the foregoing power control pattern to control the power supplied to the discharge lamp 5.

In this way, in the discharge lamp lighting apparatus 3, the first transition period C is provided to supply the larger first power value $P_1$. This makes it possible to light up the discharge lamp 5 as quickly as possible and to supply a necessary amount of power to gain a specified luminance during the steady period E.

Fourth Embodiment

Figure 5:
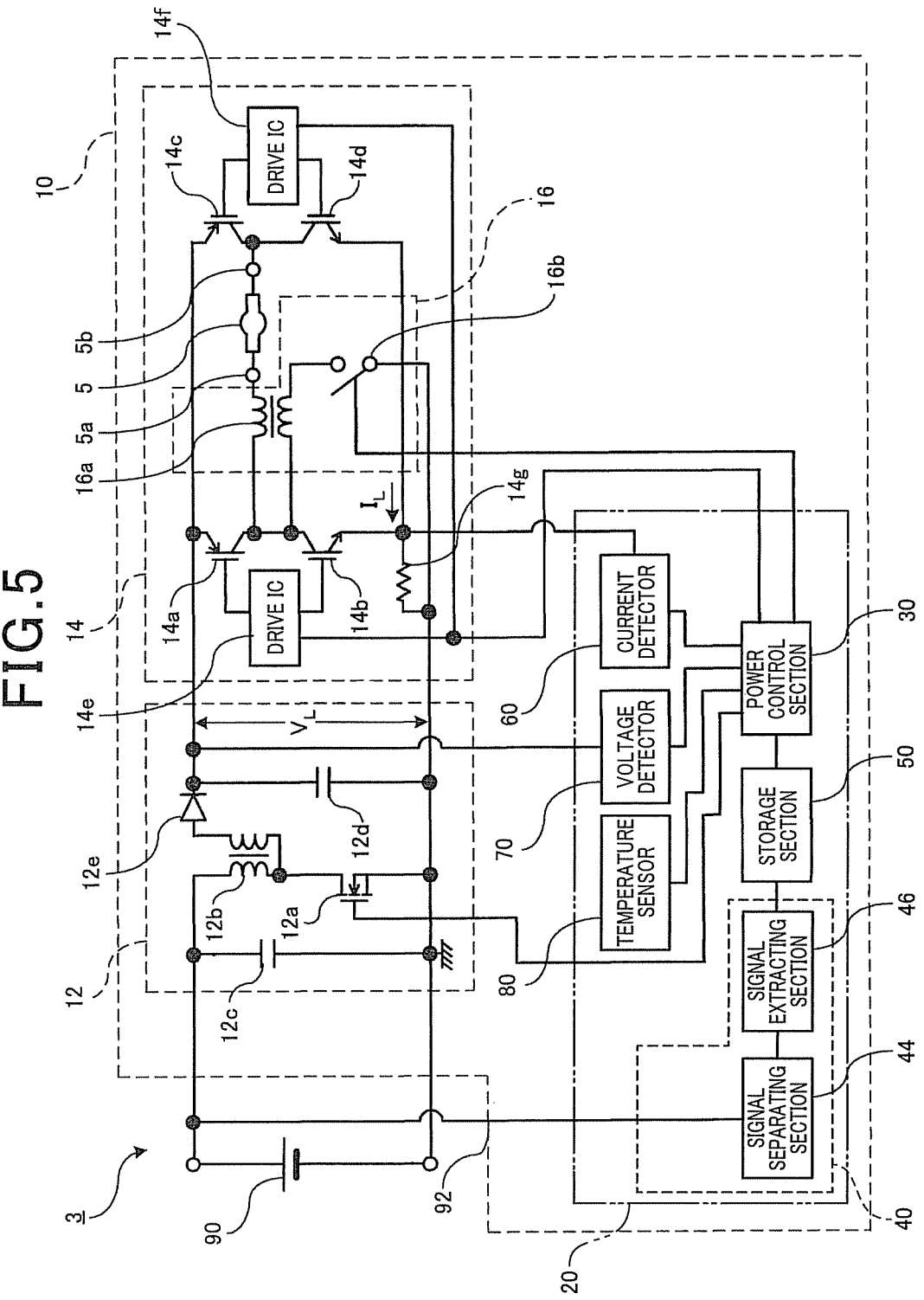
FIG. 5 is a circuit diagram showing an outlined circuit configuration of a discharge lamp lighting apparatus according to a fourth embodiment of the present invention.
Figure 6:
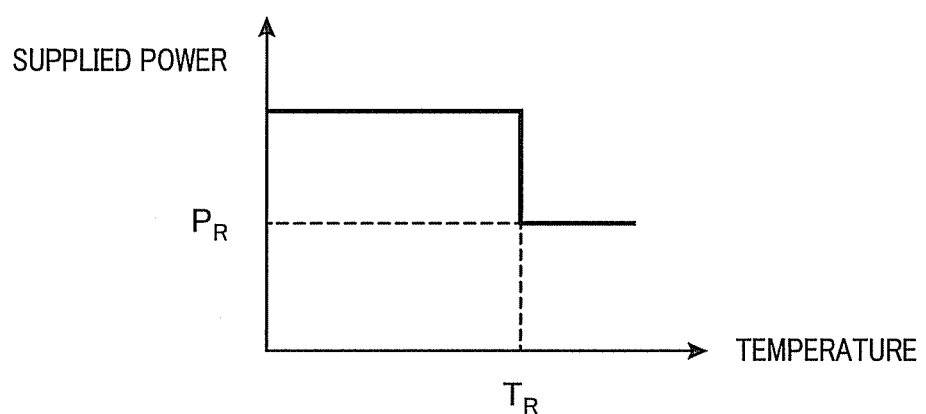
FIG. 6 is a diagram exemplifying how power control is performed by a power control section in the fourth embodiment when the temperature at the power control section has risen excessively.

Referring to FIGS. 5 and 6, a discharge lamp lighting apparatus according to a fourth embodiment of the present invention will now be described.

The discharge lamp lighting apparatus has a temperature sensor to protect the power control section in terms of temperature.

FIG. 5 shows circuitry outlining a discharge lamp lighting apparatus 3 provided with a temperature sensor 80. FIG. 6 exemplifies how the power control section 30 performs the power control when the temperature at the power control section 30 rises excessively.

The discharge lamp lighting apparatus 3 in the fourth embodiment is similar in configuration and functions to the apparatus 1 in the first embodiment, except that the apparatus 3 has the temperate sensor 80. Hence, the same reference numbers are given to the same components, omitting the same descriptions.

The discharge lamp lighting apparatus 3 is equivalent to the discharge lamp lighting apparatus 1, shown in FIG. 1 in the first embodiment, including therein the temperature sensor 80 to measure the temperature in the inside of the discharge lamp lighting apparatus 1.

The temperature sensor 80 is a sensor selected from various types of sensors such as a thermocouple, a semiconductor sensors that uses semiconductors such as silicon or diodes, a resistance sensor that uses resistance elements made of platinum, Cernox™ materials or others, or a capacitance sensor. This temperature sensor 80 is disposed within a casing and a control IC, both not shown, of the discharge lamp lighting apparatus 3, and formed to measure the temperature within the discharge lamp lighting apparatus 3 so as to output to the power control section 30 a signal indicative of a measured temperature.

The power control section 30 controls the power supplied to the discharge lamp 5 in the same way as exemplified in any of the first to third embodiments. During this control, the power control section 30 receives, from the temperature sensor 80, the signal indicative of the temperature measured within the discharge lamp lighting apparatus 3. When the measured temperature exceeds a preset temperature ($T_R$: for example, 140° C.) shown in FIG. 6, the power control section 30 lowers the power $P_R$ supplied to the discharge lamp 5.

Accordingly, if the temperature within the power control section 30 is over the preset temperature due to for example a higher device-mounted environmental temperature of a vehicle, the discharge lamp lighting apparatus 3 lowers the amount of supplied power $P_R$. As a result, load of the power control section 30 can be reduced.

Hence, it is possible to prevent the power control section 30 from malfunctioning due to causes such as generated heat.

As described, although the present invention has been described about its various embodiments, the present invention is not limited to the foregoing embodiments, but may be developed with various other modifications.

One of such modifications relates to a technique of controlling switching actions of the MOSFET 12a of the boosting section 12. The foregoing embodiments have adopted a technique of switching the MOSFET 12a by controlling the frequency of the switching pulse having a specified pulse width, which is known as PFM control. However, the control technique will not be limited to the above, but, instead, the width of the switching pulse can be adopted to control the output voltage from the boosting section 12, which is known as PWM control.

What is claimed is:

1. A discharge lamp lighting apparatus, comprising:
a discharge lamp;
power controlling means that controls power to be supplied from a power supply to the discharge lamp;
signal inputting means that accepts input of a power command signal from outside of the apparatus and extracts from the inputted power command signal commanded power values, the power command signal being for commanding a value of the power used by the power controlling means, the commanded power values commanding the value of the power; and
storage means that stores therein, at least, the commanded power value which is the newest among the commanded power values extracted by the signal inputting means; the discharge lamp, the power controlling means, the signal inputting means, and the storage means being provided integrally with each other,
wherein the power controlling means is configured to control the power to be supplied to the discharge lamp based on the newest commanded power value stored in the storage means,
the power command signal is produced to be inputted through a power line that supplies the power to the discharge lamp, and
the signal inputting means comprises
signal separating means connected to the power line and formed to separate from the power the power command signal inputted through the power line; and
signal extracting means that extracts the commanded power values from the power command signal separated by the signal separating means.

2. The discharge lamp lighting apparatus of claim 1, wherein
the storage means is configured to store the commanded power values extracted by the signal inputting means such that the extracted commanded power values are overwritten in sequence one on another.

3. The discharge lamp lighting apparatus of claim 2, further comprising:
voltage detecting means for detecting a discharge lamp voltage applied to the discharge lamp; and
current detecting means for detecting a discharge lamp current flowing via the discharge lamp,
wherein the power controlling means comprises
means for controlling the power supplied to the discharge lamp at a first constant power value for a first transition period ranging from a time when the voltage detected by the voltage detecting means temporarily decreases to a time when the voltage rises to show a predetermined change value of the detected voltage, after starting to supply the power to the discharge lamp;
means for decreasing the power with a lapse of time for a second transition period ranging from a time when the voltage detected by the voltage detecting means exceeds the predetermined change value of the detected voltage to a time when the voltage becomes constant; and
means for controlling the power at a second constant power value during a steady period after the voltage detected by the voltage detecting means becomes constant, the second constant power value being lower than the first constant power value.

4. The discharge lamp lighting apparatus of claim 3, wherein the power controlling means further comprises means for limiting the current detected by the current detecting means such that the detected current is prevented from exceeding a predetermined current threshold, when the power is supplied to the discharge lamp.

5. The discharge lamp lighting apparatus of claim 4, wherein the apparatus further comprises temperature detecting means for detecting temperature of the power controlling means,
wherein the power controlling means comprises means for decreasing the power supplied to the discharge lamp down to a predetermined value thereof when the temperature detected by the temperature detecting means exceeds a predetermined temperature.

6. The discharge lamp lighting apparatus of claim 5, wherein the discharge lamp, the power controlling means, the signal inputting means, and the storage means are electrically connected with each other and united into one apparatus.

7. The discharge lamp lighting apparatus of claim 2, wherein the apparatus further comprises temperature detecting means for detecting temperature of the power controlling means,
wherein the power controlling means comprises means for decreasing the power supplied to the discharge lamp down to a predetermined value thereof when the temperature detected by the temperature detecting means exceeds a predetermined temperature.

8. The discharge lamp lighting apparatus of claim 7, wherein the discharge lamp, the power controlling means, the signal inputting means, and the storage means are electrically connected with each other and united into one apparatus.

9. The discharge lamp lighting apparatus of claim 2, wherein the power controlling means further comprises means for limiting the current detected by the current detecting means such that the detected current is prevented from exceeding a predetermined current threshold, when the power is supplied to the discharge lamp.

10. The discharge lamp lighting apparatus of claim 1, wherein the apparatus comprises further temperature detecting means for detecting temperature of the power controlling means,
wherein the power controlling means comprises means for decreasing the power supplied to the discharge lamp down to a predetermined value thereof when the temperature detected by the temperature detecting means exceeds a predetermined temperature.

11. The discharge lamp lighting apparatus of claim 1, wherein the discharge lamp, the power controlling means, the signal inputting means, and the storage means are electrically connected with each other and united into one apparatus.

* * * * *

UNITED STATES PATENT AND TRADEMARK OFFICE
CERTIFICATE OF CORRECTION

| | |
|---|---|
| PATENT NO. | : 8,878,385 B2 |
| APPLICATION NO. | : 13/199434 |
| DATED | : November 4, 2014 |
| INVENTOR(S) | : Yoshihiro Wanda |

It is certified that error appears in the above-identified patent and that said Letters Patent is hereby corrected as shown below:

In the claims,

Col. 13, line 28, claim 1, after "power" delete "the power".

Signed and Sealed this
Twenty-eighth Day of April, 2015

Michelle K. Lee
*Director of the United States Patent and Trademark Office*